United States Patent
Olgaard (10) Patent No.: US 8,085,685 B2
(45) Date of Patent: Dec. 27, 2011

(54) METHOD AND SYSTEM FOR TESTING MULTIPLE DATA PACKET TRANSCEIVERS TOGETHER DURING A PREDETERMINED TIME INTERVAL

(75) Inventor: Christian Volf Olgaard, Saratoga, CA (US)

(73) Assignee: Litepoint Corporation, Sunnyvale, CA (US)

( * ) Notice: Subject to any disclaimer, the term of this patent is extended or adjusted under 35 U.S.C. 154(b) by 157 days.

(21) Appl. No.: 12/563,325

(22) Filed: Sep. 21, 2009

(65) Prior Publication Data
US 2011/0069624 A1    Mar. 24, 2011

(51) Int. Cl.
*H04J 3/14* (2006.01)
(52) U.S. Cl. .......... 370/252; 370/242
(58) Field of Classification Search .......... 370/242, 370/244, 250, 252, 230, 231, 235, 352, 400, 370/472, 473, 474; 455/67.14, 67.16, 67.11, 455/436, 226.3, 425, 458; 714/715, 740; 709/228, 223, 214
See application file for complete search history.

(56) References Cited

U.S. PATENT DOCUMENTS

| | | | | |
|---|---|---|---|---|
| 5,524,281 | A * | 6/1996 | Bradley et al. | 455/67.15 |
| 5,603,113 | A | 2/1997 | De Loe, Jr. | |
| 7,826,381 | B1 * | 11/2010 | Kastuar et al. | 370/242 |
| 2002/0116694 | A1 | 8/2002 | Fournier et al. | |
| 2004/0198257 | A1 | 10/2004 | Takano et al. | |
| 2004/0251922 | A1 * | 12/2004 | Martens et al. | 324/760 |
| 2005/0176376 | A1 * | 8/2005 | Liu | 455/67.16 |
| 2005/0240852 | A1 * | 10/2005 | Inaba et al. | 714/740 |
| 2006/0107186 | A1 | 5/2006 | Cowell et al. | |
| 2006/0156085 | A1 * | 7/2006 | Plaumann et al. | 714/704 |
| 2006/0195732 | A1 | 8/2006 | Deutschle et al. | |
| 2006/0215744 | A1 | 9/2006 | O'Neill et al. | |
| 2006/0220742 | A1 | 10/2006 | Manku | |
| 2007/0070881 | A1 * | 3/2007 | Olgaard et al. | 370/208 |
| 2007/0093211 | A1 * | 4/2007 | Plaumann | 455/67.14 |
| 2007/0243826 | A1 * | 10/2007 | Liu | 455/67.11 |
| 2008/0172588 | A1 * | 7/2008 | Olgaard | 714/742 |
| 2009/0094492 | A1 * | 4/2009 | Music et al. | 714/715 |
| 2009/0215444 | A1 * | 8/2009 | Topaltzas | 455/425 |
| 2009/0318103 | A1 * | 12/2009 | Feenaghty et al. | 455/226.3 |
| 2010/0075678 | A1 * | 3/2010 | Akman et al. | 455/436 |
| 2010/0115048 | A1 * | 5/2010 | Scahill | 709/213 |
| 2010/0131214 | A1 * | 5/2010 | Seely et al. | 702/58 |

(Continued)

FOREIGN PATENT DOCUMENTS
KR  10-2002-0006152 A  1/2002

OTHER PUBLICATIONS
Mexican Office Action dated Mar. 15, 2011 for Mexican Patent Application No. MX/a/2009/010601, 7 pages.

(Continued)

*Primary Examiner* — Aung S Moe
*Assistant Examiner* — Abdullah Riyami (57) ABSTRACT

A method and system for testing multiple data packet transceivers together during a predetermined time interval. A sequence of downlink data packets are generated and distributed as corresponding sequences of downlink data packets for reception by multiple data packet transceivers each one of which is responsive during at least a respective portion of a predetermined time interval to a respective one of the corresponding sequences of downlink data packets by transmitting a respective one of multiple corresponding sequences of uplink data packets. At least a portion of each of the corresponding sequences of uplink data packets are combined to provide a sequence of test data packets of which at least one signal parameter is measured.

20 Claims, 5 Drawing Sheets

U.S. PATENT DOCUMENTS

2010/0197299 A1* 8/2010 Huber et al. .................. 455/425
2010/0317374 A1* 12/2010 Alpert et al. .................. 455/458

OTHER PUBLICATIONS

International Search Report for PCT/US2010/028990, filed Mar. 29, 2010, 4 pages.
Written Opinion of the International Searching Authority for PCT/US2010/028990, filed Mar. 29, 2010, 4 pages.
International Search Report corresponding to PCT Application No. PCT/US2010/052283, 5 pages.
Written Opinion corresponding to PCT Application No. PCT/US2010/052283, 4 pages.
International Search Report corresponding to PCT Application No. PCT/US2010/048938, 6 pages.
Written Opinion corresponding to PCT Application No. PCT/US2010/048938, 5 pages.

* cited by examiner

METHOD AND SYSTEM FOR TESTING MULTIPLE DATA PACKET TRANSCEIVERS TOGETHER DURING A PREDETERMINED TIME INTERVAL

BACKGROUND OF THE INVENTION

1. Field of the Invention

The present invention relates to methods and systems for testing wireless devices, and in particular, methods and systems for testing wireless devices in parallel to reduce overall test time by interleaving portions of individual data packets into a composite packet for analysis.

2. Related Art

Many current handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data.

In general, these wireless-connectivity capabilities (e.g. WiFi, WiMAX, Bluetooth, etc.) are defined by industry-approved standards (e.g., IEEE 802.11 and IEEE 802.16) which specify the parameters and limits to which devices having those connectivity capabilities must adhere.

At any point along the device-development continuum, it may be necessary to test and verify that a device is operating within its standards' specifications. Testing takes time, requires specialized instrumentation and adds to the cost of producing such devices. Therefore, it would be desirable to have techniques for reducing overall test time without compromising on required thoroughness.

When devices are tested contemporaneously, test-time per unit is reduced by the number of devices. For example, if testing a single device takes 100 seconds, and testing four of them contemporaneously can be done in 100 seconds, then the test-time per device becomes 25 seconds. Further, if each contemporaneous packet can be used for more than one test-sequence capture, then overall test time can be reduced even more.

SUMMARY OF THE INVENTION

In accordance with the presently claimed invention, contemporaneous testing of multiple devices under test (DUTs) can be performed by time-interleaving various data packet portions. Contemporaneous synchronized data packets from multiple DUTs can be multiplexed and interleaved to capture one or more test sequences during a minimal duration of a single packet as described by its underlying standard. As a result, overall test time is substantially reduced.

In accordance with the presently claimed invention, a method and system are provided for testing multiple data packet transceivers together during a predetermined time interval. A sequence of downlink data packets are generated and distributed as corresponding sequences of downlink data packets for reception by multiple data packet transceivers each one of which is responsive during at least a respective portion of a predetermined time interval to a respective one of the corresponding sequences of downlink data packets by transmitting a respective one of multiple corresponding sequences of uplink data packets. At least a portion of each of the corresponding sequences of uplink data packets are combined to provide a sequence of test data packets of which at least one signal parameter is measured.

In accordance with one embodiment of the presently claimed invention, a method for testing multiple data packet transceivers together during a predetermined time interval includes:

generating a sequence of downlink data packets;

distributing the sequence of downlink data packets as a plurality of corresponding sequences of downlink data packets;

receiving, with a respective one of a plurality of data packet transceivers during at least a respective portion of a predetermined time interval, each of the plurality of corresponding sequences of downlink data packets and in response thereto transmitting a respective one of a plurality of corresponding sequences of uplink data packets;

combining at least a portion of each of the plurality of corresponding sequences of uplink data packets to provide a sequence of test data packets; and measuring at least one signal parameter of the sequence of test data packets.

In accordance with another embodiment of the presently claimed invention, an apparatus including a system for testing multiple data packet transceivers together during a predetermined time interval includes:

signal generator circuitry to provide a sequence of downlink data packets;

signal distribution circuitry coupled to the signal generator circuitry and responsive to the sequence of downlink data packets and one or more distribution control signals by providing a plurality of corresponding sequences of downlink data packets for reception by a plurality of data packet transceivers each one of which is responsive during at least a respective portion of a predetermined time interval to a respective one of the plurality of corresponding sequences of downlink data packets by transmitting a respective one of a plurality of corresponding sequences of uplink data packets;

signal combining circuitry responsive to at least a portion of each of the plurality of corresponding sequences of uplink data packets and one or more combining control signals by providing a sequence of test data packets; and signal measurement circuitry coupled to the signal combining circuitry and responsive to the sequence of test data packets and one or more measurement control signals by measuring at least one signal parameter of the sequence of test data packets.

In accordance with still another embodiment of the presently claimed invention, an apparatus including a system for testing multiple data packet transceivers together during a predetermined time interval includes:

signal generator means for generating a sequence of downlink data packets;

signal distributor means for responding to one or more distribution control signals by distributing the sequence of downlink data packets as a plurality of corresponding sequences of downlink data packets for reception by a plurality of data packet transceivers each one of which is responsive during at least a respective portion of a predetermined time interval to a respective one of the plurality of corresponding sequences of downlink data packets by transmitting a respective one of a plurality of corresponding sequences of uplink data packets;

signal combiner means for responding to one or more combining control signals by combining at least a portion of each of the plurality of corresponding sequences of uplink data packets to provide a sequence of test data packets; and signal measuring means for responding to one or more measurement control signals by measuring at least one signal parameter of the sequence of test data packets.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Figure 1:
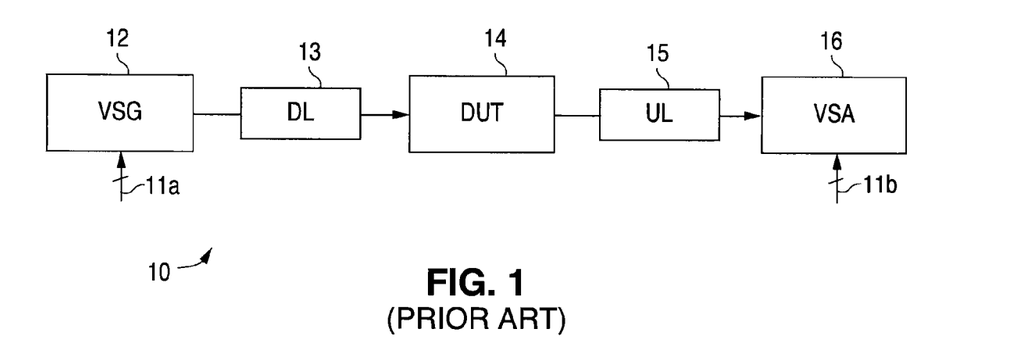
FIG. 1 depicts a conventional method for testing the transmit (TX) function of a DUT that employs a wireless standard, e.g., WiMAX, where a downlink packet triggers transmission of an uplink packet.

Referring to FIG. 1, a conventional test system 10 for testing a wireless standard, such as IEEE 802.16e (WiMAX), might send a downlink packet DL 13 from the VSG 12, in accordance with one or more user or programmed control inputs 11a, to the DUT 14, which, in turn, would transmit an uplink packet UL 15. This would be captured and evaluated (e.g., via signal power measurements, etc.) by the VSA 16, in accordance with one or more user or programmed control inputs 11b. In the case of WiMAX, the duration for the DL packet 13 followed by the UL packet 15 is a minimum of five milliseconds (5 ms). Thus, the minimum test time required for testing one DL packet 13 followed by the initiated UL packet 15 using this test approach would be at least 5 ms.

Figure 2:
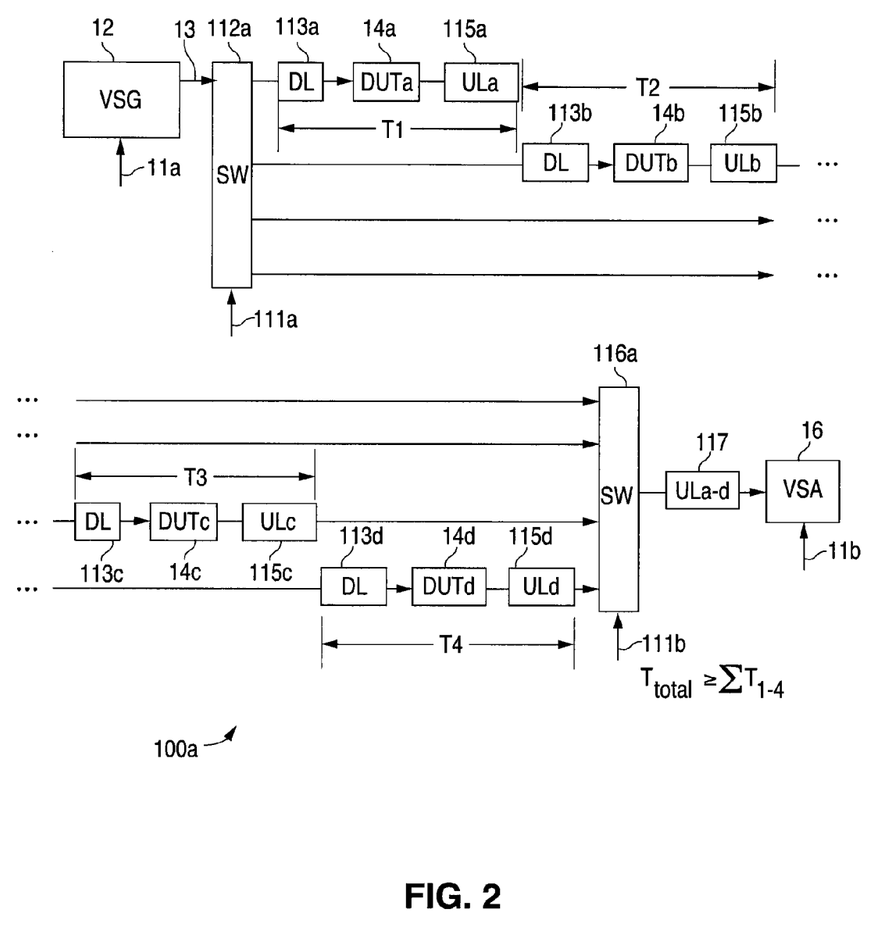
FIG. 2 depicts a method of generating, e.g., with a vector signal generator (VSG), and sending a sequential series of downlink packets to multiple DUTs and then capturing the resulting sequential uplink packets and switching them, e.g., one at a time, for analysis, e.g., with a vector signal analyzer (VSA).

Referring to FIG. 2, in accordance with one embodiment of the presently claimed invention, a test system 100a with a single VSG 12 and VSA 16 could sequentially test multiple DUTs 14a, 14b, 14c, 14d by using switching circuitry 112a, in accordance with one or more user or programmed control inputs 111a, to distribute DL packets 113a, 113b, 113c, 113d to their respective DUTs 14a, 14b, 14c, 14d following a preceding responsive UL packet 115a, 115b, 115c, 115d. (For example, distribution of the next DL packet 113a, 113b, 113c, 113d by the switching circuitry 112a can be initiated by the one or more user or programmed control inputs 111a following a predetermined time interval. Alternatively, each DUT 14a, 14b, 14c, 14d can send a status or acknowledgement signal to activate one of the one or more user or programmed control inputs 111a to initiate distribution of the next DL packet 113a, 113b, 113c, 113d by the switching circuitry 112a.)

The resulting UL packets 115a, 115b, 115c, 115d would then be switched, in turn, by additional switching circuitry 116a, in accordance with one or more user or programmed control inputs 111b, to be combined into a UL packet sequence 117 for analysis by the VSA 16. With each DL+UL packet duration being at least 5 ms, the minimum total test time for testing one DL+UL packet sequence from each of the four DUTs would be 4*5 ms, or 20 ms. (As will be readily appreciated by one of ordinary skill in the art, however, in actual practice, due to signal latencies, expected total test time will likely be somewhat greater than 20 ms.)

Figure 3:
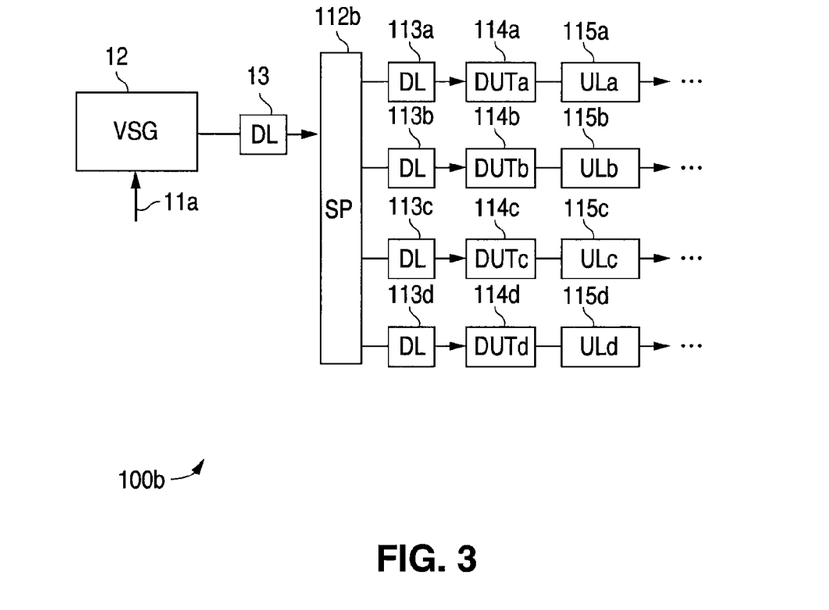
FIG. 3 depicts a method of sending a downlink packet in parallel to four DUTs and having each DUT initiate a corresponding uplink packet.

Referring to FIG. 3, in accordance with another embodiment of the presently claimed invention, a test system 100b with a single VSG 12 and VSA 16 (not shown) could be designed to capture each single DL packet 13 using a signal splitter 112b (e.g., a resistive power divider) to create four similar DL packets 113a, 113b, 113c, 113d. These DL packets 113a, 113b, 113c, 113d would be contemporaneously sent to multiple (e.g., four) DUTs 14a, 14b, 14c, 14d to initiate multiple (e.g., four) contemporaneous UL packets 115a, 115b, 115c, 115d. Accordingly, it may be possible to initiate contemporaneous UL data packets 115a, 115b, 115c, 115d by providing contemporaneous DL data packets 113a, 113b, 113c, 113d to each DUT 14a, 14b, 14c, 14d.

Figure 3A:
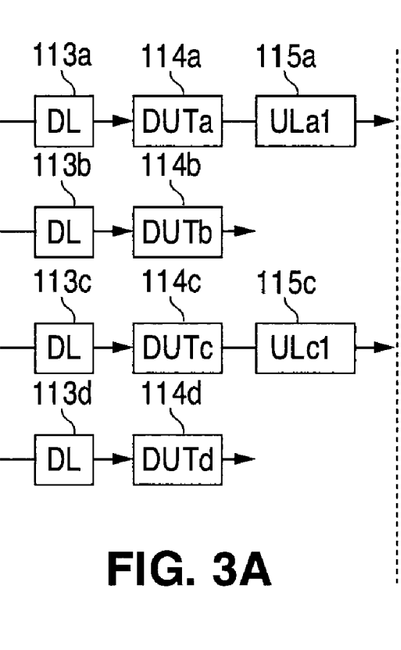
FIGS. 3A, 3B and 3C depict possible initial conditions of the process in FIG. 3 wherein, due to different initialization and synchronizing latencies, it may take more than one downlink packet to elicit contemporaneous uplink packets from the multiple DUTs.
Figure 3B:
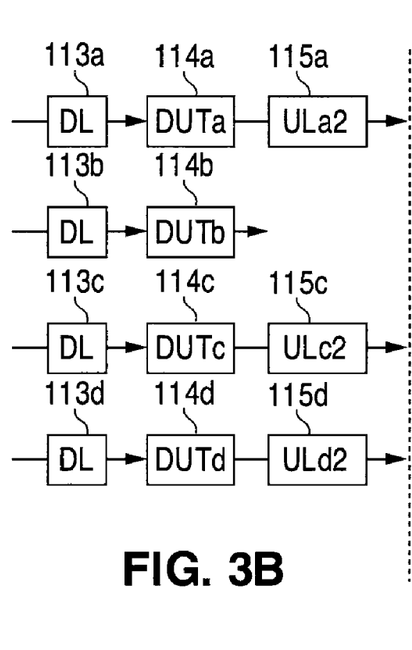
Figure 3C:
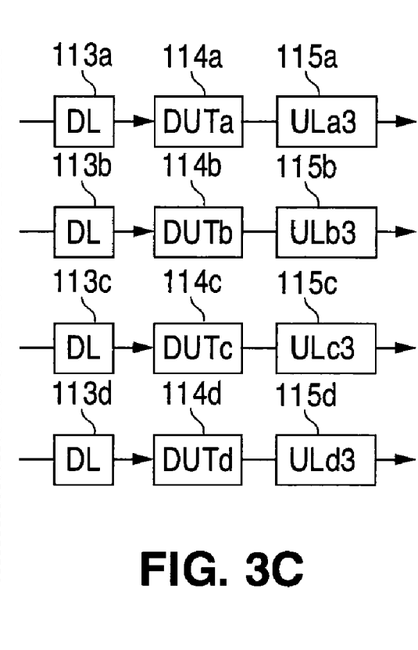

Referring to FIGS. 3A, 3B and 3C, however, the DUTs 14a, 14b, 14c, 14d may have different initialization and synchronization characteristics. Thus, as depicted in FIG. 3A, the first set of parallel, similar DL packets 113a, 113b, 113c, 113d sent to the DUTs 14a, 14b, 14c, 14d may initiate only a subset of UL packets 115a, 115c. As depicted in FIG. 3B, a second set of parallel, similar DL packets 113a, 113b, 113c, 113d may still initiate only a subset of UL packets 115a, 115c, 115d. However, as depicted in FIG. 3C, once all DUTs 14a, 14b, 14c, 14d are initialized and synchronized, all subsequent parallel, similar DL packets 113a, 113b, 113c, 113d will initiate a full set of contemporaneous UL packets 115a, 115b, 115c, 115d. Hence, following initialization and synchronization, a single DL packet 13 provided by a single VSG 12 and distributed by a signal splitter 112b as similar, contemporaneous DL packets 113a, 113b, 113c, 113d will, when received by multiple DUTs 14a, 14b, 14c, 14d, initiate a corresponding set of contemporaneous UL packets 115a, 115b, 115c, 115d, as depicted in FIG. 3.

It will be readily appreciated by one of ordinary skill in the art that sending split DL packets 113a, 113b, 113c, 113d in this manner is just one example of how contemporaneous UL packets 115a, 115b, 115c, 115d can be initiated. What is more important for purposes of the presently claimed invention is initiation of contemporaneous responsive UL packets 115a, 115b, 115c, 115d.

Figure 4:
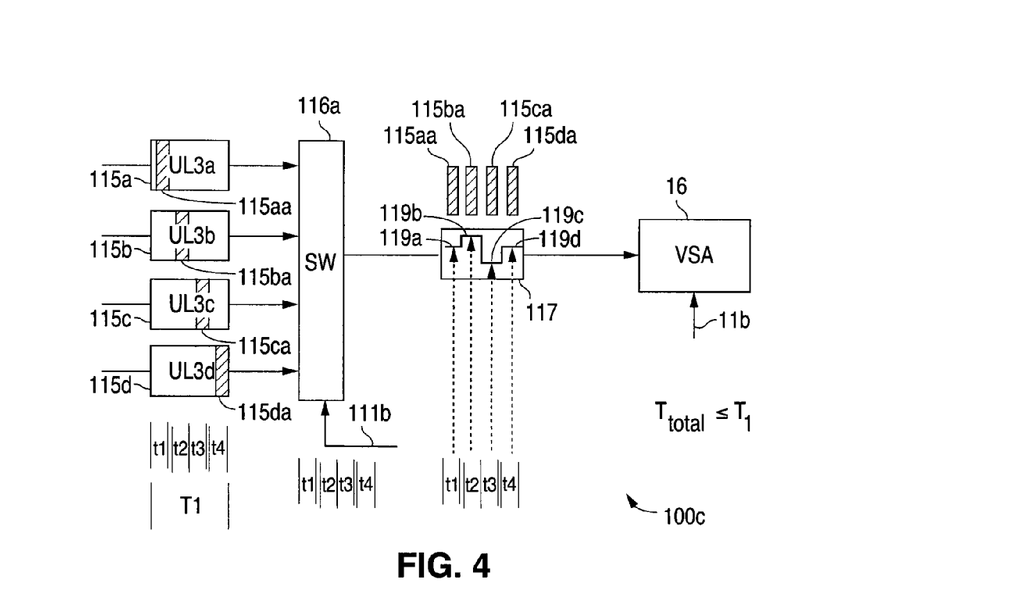
FIG. 4 depicts four parallel uplink packets being time-interleaved to produce a single uplink packet including packet components from each of the four individual uplink packets being transferred to the VSA for analysis.

Referring to FIG. 4, in accordance with another embodiment of the presently claimed invention, using a test system 100c with a single VSA 16, contemporaneous UL packets 115a, 115b, 115c, 115d can be multiplexed by the switching circuit 116a such that only a portion of each data packet is actually switched, sequentially, within the total duration time of a single data packet. Accordingly, as an example, with a switched sampling interval of 1 ms, the sampled 1-ms portions 115aa, 115ba, 115ca, 115da of each UL packet 115a, 115b, 115c, 115d would be sequentially transferred by the switch 116a, thereby producing an interleaved packet 117 containing a sequence of the sampled 1-ms portions 115aa, 115ba, 115ca, 115da of the original UL packets 115a, 115b, 115c, 115d.

It will be readily appreciated by one of ordinary skill in the art that this signal switching method is illustrative rather than exclusive. For example, a 1-by-4 switch can be used, as discussed above, or a pair of 1-by-2 switches can be used, or a programmable attenuator can be used in which the desired signal path is programmed to have low attenuation (e.g., substantially zero impedance) while the undesired signal paths are programmed to have high attenuation (i.e., substantially greater than that of the desired signal path), all of which will achieve similar results for purposes of the presently claimed invention.

The VSA 16 receives the time-interleaved packet 117 and can discern via synchronization (e.g., via the one or more control inputs 11b) which portion 115aa, 115ba, 115ca, 115da of the received packet 117 was contributed by which UL packet 115a, 115b, 115c, 115d. For example, measurements of power generally require only small portions 119a, 119b, 119c, 119d of the packet to be measured. By interleaving small portions 115aa, 115ba, 115ca, 115da of the UL packets 115a, 115b, 115c, 115d, the VSA 16 will be able to test within a single 5-ms interval the power output of all DUTs 14a, 14b, 14c, 14d. As a result, in the case of WiMAX, for example, the sequential test time of a minimum of 20 ms can now be reduced by a factor of four to 5 ms. Power measurement is a key component of DUT calibration and is often one of the longer testing procedures. Hence, cutting such a major component of calibration testing by 75 percent through parallel testing combined with time-interleaved capture can have a significant impact on test-time efficiencies. It will be readily appreciated by one of ordinary skill in the art that, in addition to or instead of power, other signal parameters or properties can be measured in accordance with the presently claimed invention. In other words, other signal parameters or properties are capable of being quantified by sampling a portion of a packet without necessarily requiring knowledge about the packet header, e.g., signal spectral properties or signal quality such as signals according to the IEEE 802.16e standard which allows measurement of error vector magnitude (EVM) without knowledge about the packet header.

Figure 5:
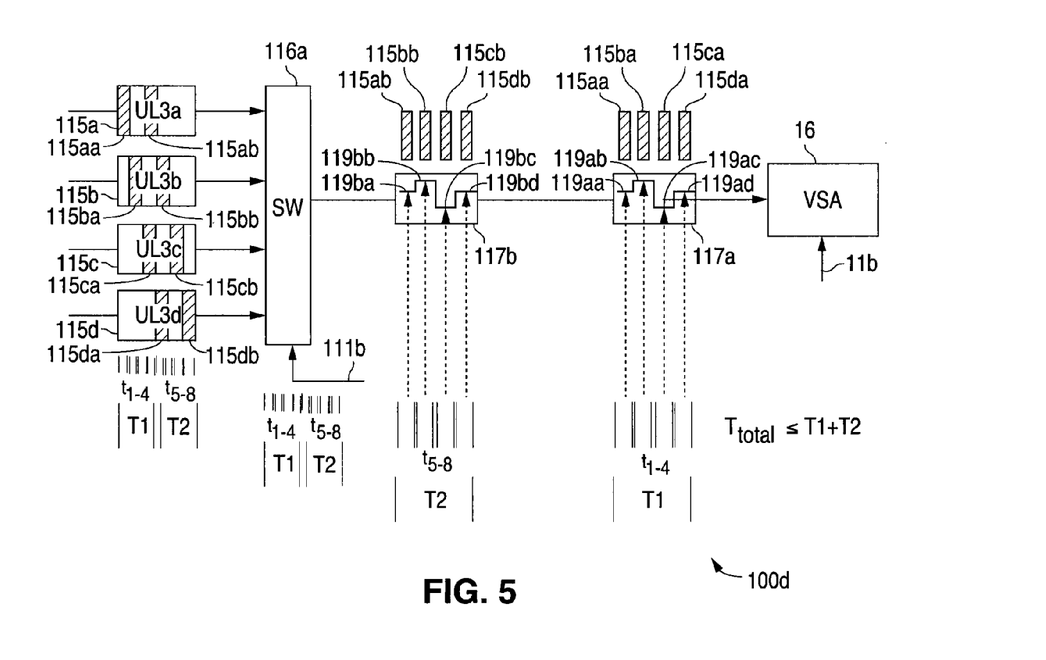
FIG. 5 depicts four parallel uplink packets being time-interleaved to produce a sequence of uplink packets including different sequences from each of the four individual uplink packets being transferred to the VSA for analysis (e.g., capture and interleaving of packet portions used for determining power spectral density in conformance with a standard power spectral mask).

Referring to FIG. 5, in accordance with another embodiment of the presently claimed invention, also using a test system 100d with a single VSA 16, in addition to measuring power of contemporaneous UL packets 115a, 115b, 115c, 115d whose output power is kept constant, power can also be measured as it varies within the packet duration time interval T1+T2. The switch 116a can be synchronized (e.g., via the one or more control inputs 111b) to capture eight portions 115aa, 115ab, 115ba, 115bb, 115ca, 115cb, 115da, 115db. During time intervals T1 and T2, there are eight switched capture intervals, $t_{1-4}$ and $t_{5-8}$, respectively. During capture intervals $t_{1-4}$ of T1, each UL packet 115a, 115b, 115c, 115d is sampled once to produce a first respective packet sample 115aa, 115ba, 115ca, 115da for combining, e.g., multiplexing, into a first data packet 117a for the VSA 16. During capture intervals $t_{5-8}$ of T2, each UL packet 115a, 115b, 115c, 115d is sampled once again to produce a second respective packet sample 115ab, 115bb, 115cb, 115db for combining, e.g., multiplexing, into a second data packet 117b for the VSA 16. Hence, the VSA 16 receives eight samples for analysis within the same time interval as the four samples using the system 100c of FIG. 4.

Spectral power density masks may require a complete packet sample to do the analysis, and in some cases measure average power over more than one packet. Where the number of necessary samples would require more than the minimum interval for complete capture and multiplexing, in accordance with another embodiment of the presently claimed invention, a subset of samples can be captured from a first set of contemporaneous UL packets, with additional subsets of samples captured from subsequent sets of contemporaneous UL packets. The combination of parallel synchronization and interleaving would still provide a significant time savings.

Figure 6:
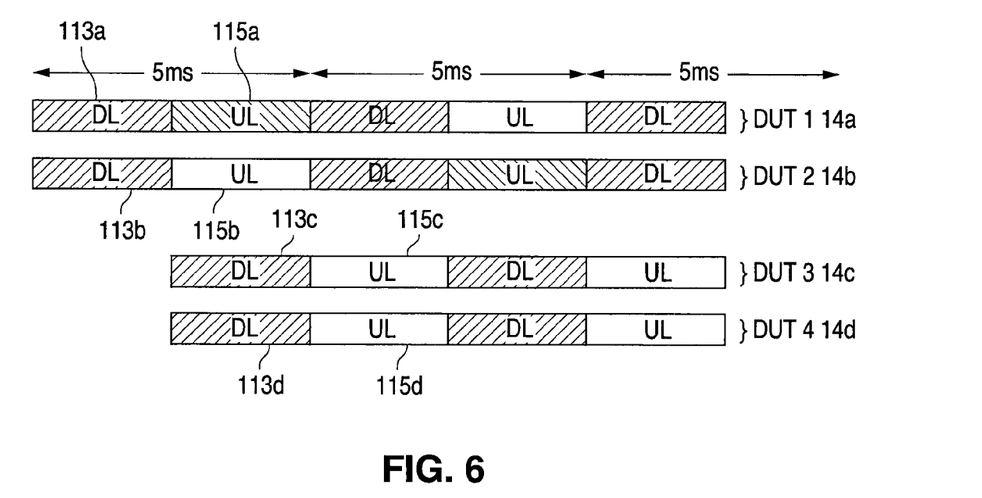
FIGS. 6 and 7 depict a "pipelined" approach to time interleaving for higher utilizations of the VSA and VSG.

Referring to FIG. 6, in accordance with another embodiment of the presently claimed invention, since the UL packets are transmitted synchronously thereby making the timing of the packets known, the UL packets initiated by the different DUTs can be mutually offset in time. So long as the relative timing among the offset packets is known, parallel interleaved testing can be done as discussed above. For example, in the case of WiMAX, the full 5 ms time slot (assuming 2.5 ms each for the DL and UL packets) could be used for UL packet transmission, thereby enabling the opportunity to capture four full packets in 2.5*5 ms=7.5 ms (i.e., 2.5 time slots).

This can be achieved, for example, by offsetting the DL packets 113a, 113b, 113c, 113d to two of the four DUTs 14a, 14b, 14c, 14d by half a time slot, e.g., so two DUTS 14a, 14b receive their DL packets 113a, 113b in the first 2.5 ms of the 5-ms time slot, and the two other DUTS 14c, 14d receive their DL packets 113c, 113d in the second 2.5 ms of the 5-ms time slot. Accordingly, the first corresponding UL packets 115a, 115b are initiated in the second 2.5 ms of the 5-ms time slot, and the second corresponding UL packets 115c, 115d are initiated in the first 2.5 ms of the subsequent 5-ms time slot.

The VSA 16 (not shown) captures the UL packet 115a from the first DUT 14a. In parallel with the first UL packets 115a, 115b, the second DL packets 113c, 113d are transmitted, thereby initiating the second UL packets 115c, 115d. The third UL packet 115c from the third DUT 14c is then captured by the VSA 16. As a result, the VSA 16 would be processing UL packets with no idle time. If the process is repeated by capturing the UL packets 115b, 115d from the second DUT 14b and fourth DUT 14d, only 2.5 time slots are needed to measure all four 2.5-ms UL packets 115a, 115b, 115c, 115d from all four DUTs 14a, 14b, 14c, 14d. Similarly, the VSG 12 (not shown) would be issuing DL packets 113a, 113b, 113c, 113d with no idle time. Hence, full utilization of both the VSG 12 and VSA 16 can be achieved, thereby allowing more data to be gathered during each 5-ms time interval, e.g., two-packet spectral mask measurements per 5-ms time interval.

As will be readily appreciated by one of ordinary skill in the art, some minimum signal isolation between the DUTs will be required since some DUTs will be transmitting UL packets while other DUTs are receiving DL packets. However, as will be further appreciated by one of ordinary skill in the art, sufficient isolation (e.g., greater than 60 dB) can be achieved using traditional shield boxes, etc, so as long as the power of the VSG is relatively high. This should not be problematic since the transmitted VSG signal level will generally be substantially greater than that of any coupled signals caused by UL packets being transmitted by DUTs. Further, such coupled signals will appear as in-band interference for which such systems are designed to compensate. Alternatively, the VGA transmit frequency can be shifted slightly between the two sets of data to prevent false packet detection. While this latter approach may require two or more shield boxes, the fully synchronized approach should require only one shield box, with the four DUTs placed in the same shield box. While testing packet-error-rate (PER) would require re-synchronization of the DUTs so as to operate them in parallel rather than time offset, any additional time for such re-synchronization would be minimal compared to effectively halving the packet capture time as discussed above.

As will be readily appreciated by one of ordinary skill in the art, the testing methods as discussed above can be extended to testing of two sets of four DUTs. This will effectively further double the throughput, provided the analysis speed is sufficiently high.

Figure 7:
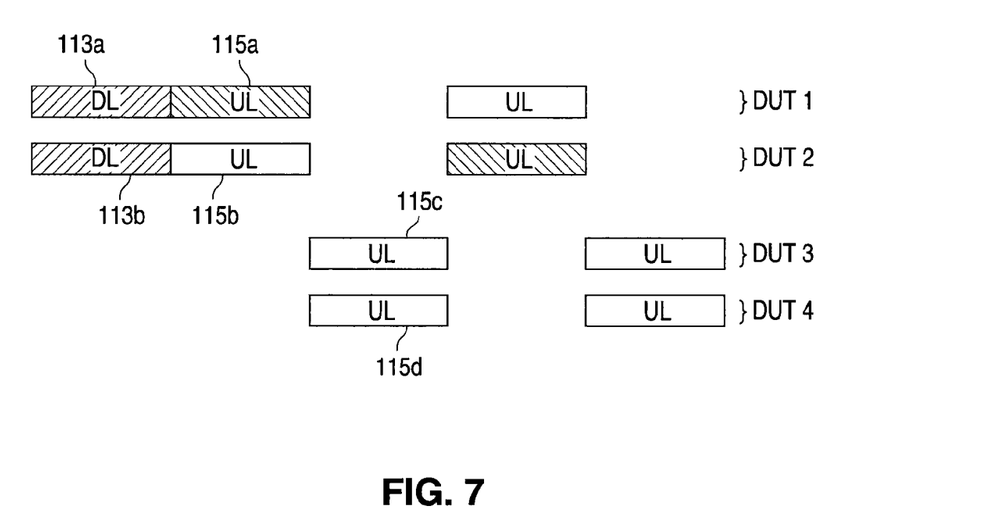

Referring to FIG. 7, in accordance with another embodiment of the presently claimed invention, the drivers of the DUT 14a, 14b, 14c, 14d can be programmed to transmit using a specified offset in time relative to the start signal (e.g., the incoming DL packet 113a, 113b, 113c, 113d or a programmed start time). As a result, the VSA 16 would again be fully utilized as UL packets 115a, 115b, 115c, 115d occur in pairs, offset in time as described. For example, the VSA 16 would receive the first pair of UL packets 115a, 115b programmed to follow their DL packets 113a, 113b, and the two other DUTs 14c, 14d would generate UL packets 115c, 115d with a programmed delay, e.g., by 2.5 ms after the end of their corresponding DL packets 113c, 113d. Other combinations will be readily apparent to one of ordinary skill in the art.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing multiple data packet transceivers together during a predetermined time interval, comprising:

generating a sequence of downlink data packets;

distributing, to a plurality of data packet transceivers, said sequence of downlink data packets as a plurality of corresponding sequences of downlink data packets;

receiving, with a respective one of said plurality of data packet transceivers during at least a respective portion of a predetermined time interval, each of said plurality of corresponding sequences of downlink data packets and in response thereto transmitting by said respective one of said plurality of data packet transceivers a respective one of a plurality of corresponding sequences of uplink data packets;

combining a portion of each of said plurality of corresponding sequences of uplink data packets to provide a sequence of test data packets; and measuring at least one signal parameter of said sequence of test data packets.

2. The method of claim 1, wherein said distributing comprises switching said sequence of downlink data packets to provide respective ones of said plurality of corresponding sequences of downlink data packets.

3. The method of claim 1, wherein said distributing comprises demultiplexing said sequence of downlink data packets to provide respective ones of said plurality of corresponding sequences of downlink data packets.

4. The method of claim 1, wherein said distributing comprises attenuating selected ones of said plurality of corresponding sequences of downlink data packets.

5. The method of claim 1, wherein said distributing comprises providing said plurality of corresponding sequences of downlink data packets simultaneously.

6. The method of claim 1, wherein said combining comprises switching at least a portion of each of said plurality of corresponding sequences of uplink data packets to provide said sequence of test data packets.

7. The method of claim 1, wherein said combining comprises multiplexing at least a portion of each of said plurality of corresponding sequences of uplink data packets to provide said sequence of test data packets.

8. The method of claim 1, wherein said combining comprises selectively attenuating at least a portion of each of said plurality of corresponding sequences of uplink data packets to provide said sequence of test data packets.

9. The method of claim 1, wherein said measuring comprises measuring a power level of at least a portion of said sequence of test data packets.

10. An apparatus including a system for testing multiple data packet transceivers together during a predetermined time interval, comprising:

signal generator circuitry to provide a sequence of downlink data packets;

signal distribution circuitry coupled to said signal generator circuitry and responsive to said sequence of downlink data packets and one or more distribution control signals by providing a plurality of corresponding sequences of downlink data packets for reception by a plurality of data packet transceivers each one of which is responsive during at least a respective portion of a predetermined time interval to a respective one of said plurality of corresponding sequences of downlink data packets by transmitting by said each one of said plurality of data packet transceivers a respective one of a plurality of corresponding sequences of uplink data packets;

signal combining circuitry responsive to a portion of each of said plurality of corresponding sequences of uplink data packets and one or more combining control signals by providing a sequence of test data packets; and signal measurement circuitry coupled to said signal combining circuitry and responsive to said sequence of test data packets and one or more measurement control signals by measuring at least one signal parameter of said sequence of test data packets.

11. The apparatus of claim 10, wherein said signal generator circuitry comprises a vector signal generator.

12. The apparatus of claim 10, wherein said signal distribution circuitry comprises signal switching circuitry.

13. The apparatus of claim 10, wherein said signal distribution circuitry comprises signal demultiplexing circuitry.

14. The apparatus of claim 10, wherein said signal distribution circuitry comprises signal attenuation circuitry.

15. The apparatus of claim 10, wherein said signal distribution circuitry comprises signal splitting circuitry.

16. The apparatus of claim 10, wherein said signal combining circuitry comprises signal switching circuitry.

17. The apparatus of claim 10, wherein said signal combining circuitry comprises signal multiplexing circuitry.

18. The apparatus of claim 10, wherein said signal combining circuitry comprises signal attenuation circuitry.

19. The apparatus of claim 10, wherein said signal measurement circuitry comprises a vector signal analyzer.

20. An apparatus including a system for testing multiple data packet transceivers together during a predetermined time interval, comprising:

signal generator for generating a sequence of downlink data packets;

signal distributor for responding to one or more distribution control signals by distributing said sequence of downlink data packets as a plurality of corresponding sequences of downlink data packets for reception by a plurality of data packet transceivers each one of which is responsive during at least a respective portion of a predetermined time interval to a respective one of said plurality of corresponding sequences of downlink data packets by transmitting by said each one of said plurality of data packet transceivers a respective one of a plurality of corresponding sequences of uplink data packets;

signal combiner for responding to one or more combining control signals by combining a portion of each of said plurality of corresponding sequences of uplink data packets to provide a sequence of test data packets; and signal measurer for responding to one or more measurement control signals by measuring at least one signal parameter of said sequence of test data packets.

* * * * *